Figure 1:
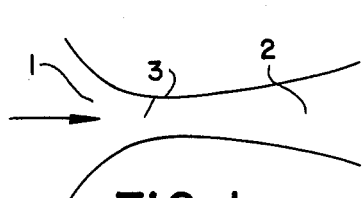

United States Patent [19]

Straub et al.

[11] Patent Number: 4,792,284

[45] Date of Patent: Dec. 20, 1988

[54] DEVICE FOR CREATING AND EXPLOITING A PRESSURE DIFFERENCE AND THE TECHNICAL APPLICATION THEREOF

[76] Inventors: Paul W. Straub, Schlösslistr. 2, Frauenkappelen CH-3202, Switzerland; John H. Stark, Grundbachstr., Wattenwil CH-3135, Switzerland; Michel Vermot, Flachseren 93 c, Vinelz CH-3234, Switzerland

[21] Appl. No.: 57,927

[22] PCT Filed: Sep. 19, 1986

[86] PCT No.: PCT/CH86/00132

§ 371 Date: May 19, 1987

§ 102(e) Date: May 19, 1987

[87] PCT Pub. No.: WO87/01770

PCT Pub. Date: Mar. 26, 1987

[30] Foreign Application Priority Data

Sep. 21, 1985 [CH] Switzerland .......................... 4085/85
Jul. 3, 1986 [CH] Switzerland .......................... 2674/86

[51] Int. Cl.[4] .................. F04F 5/44; F04B 23/04
[52] U.S. Cl. ........................ 417/77; 417/87; 417/151; 417/196; 417/198
[58] Field of Search ............ 417/54, 76, 77, 87, 417/151, 181, 196, 198

[56] References Cited

U.S. PATENT DOCUMENTS

| | | | |
|---|---|---|---|
| 2,038,103 | 4/1936 | Fraser | 417/151 X |
| 2,080,623 | 5/1937 | McMahon | 417/76 |
| 2,080,624 | 5/1937 | McMahon | 417/172 |
| 2,093,408 | 9/1937 | Batterson | 417/191 |
| 2,834,312 | 5/1958 | Baxter . | |
| 2,980,033 | 4/1961 | Waddington et al. | 417/196 |
| 3,563,674 | 2/1971 | Moffat et al. | 417/196 |
| 4,021,146 | 5/1977 | Tippetts et al. | 417/76 |

FOREIGN PATENT DOCUMENTS

| | | |
|---|---|---|
| 125181 | 11/1901 | Fed. Rep. of Germany . |
| 609062 | 2/1935 | Fed. Rep. of Germany . |
| 829648 | 1/1952 | Fed. Rep. of Germany . |
| 3417610 | 1/1985 | Fed. Rep. of Germany . |
| 337171 | 3/1904 | France . |
| 482827 | 2/1917 | France .................................. 417/77 |
| 740179 | 1/1933 | France . |
| 1411895 | 10/1962 | France . |
| 1310598 | 8/1965 | France . |
| 2114898 | 6/1972 | France . |
| 322228 | 7/1957 | Switzerland . |
| 292031 | 6/1928 | United Kingdom . |

OTHER PUBLICATIONS

V.D.I. Zeitschrift, Bank 101, Nr. 34, Dec. 1, 1959, (Dusseldork, DE), F. Schupp: "Regelbars Mehrfach–Strahlsauger", siehe Figuren 1, 3-7.

Proceedings of the Institution of Mechanical Engineers, Bank 185, Nr. 56, 1971, (London, GB), M. L. Hoggarth: "The Design and Performance of High--Pressure Injectors as Gas Jet Boosters", siehe Seite 756, Figur 1C.

*Primary Examiner*—Carlton R. Croyle
*Assistant Examiner*—Paul F. Neils
*Attorney, Agent, or Firm*—Gilbert L. Wells

[57] ABSTRACT

A device for creating a pressure difference in the flow of a fluid which may be a liquid or a gas and a number of technical applications. The fluid medium is fed along the longitudinal axis of a double cone, consisting of two coaxial hollow cones linked by their smallest faces. At the narrowest point of the double cone a depression occurs in the fluid flow which is made accessible to the outside by means of a lateral connection piece. Compared with a conventional venturi the present double cone offers increased efficiency owing to its special shape, which is defined by geometric parameters. The high efficiency of the double cone, which can be further improved by a special embodiment, makes the device suitable for a number of technical applications.

5 Claims, 9 Drawing Sheets

DEVICE FOR CREATING AND EXPLOITING A PRESSURE DIFFERENCE AND THE TECHNICAL APPLICATION THEREOF

The present invention deals with a process for creating a pressure difference by means of a tube of a certan shape, through which a fluid medium, i.e. a liquid or a gas is flowing. Furthermore the invention comprises a device suitable for carrying out the process as well as different technical applications of the process.

The process according to this invention is based on a modification of the venturi tube. This device, which has been known for nearly two hundred years, represents, by its shape, a body which is generated by rotating a complicated asymmetrical curve about an axis of symmetry. This body is a tube which, according to the form of the curve, along its longitudinal direction is narrowing and then again widening. If a liquid is flowing along the venturi tube, a reduced pressure (compared with the pressure at the entrance and exit cross-sections) is generated, whereby the pressure difference, following Bernoulli's law, reaches a maximum at the narrowest point of the tube.

Today the venturi tube still occupies a position of practical importance, e.g. as an instrument for the measurement of the flow velocity of liquids and gases along tubes, for the measurement of the speed of planes and ships, as a water jet pump (FIG. 2) for evacuating vessels, and furthermore in carburettors of internal combustion motors and in devices for the scrubbing of gases.

When using the venturi tube as a measuring instrument it proves to be of disadvantage, that the pressure difference read at the measuring point does not depend in a simple and calculable manner on the flow velocity. Many other factors, such as e.g. the viscosity and the density of the flowing medium, the pressure values at the entrance and exit and, last but not least, the exact geometry of the nozzle shape and the surface roughness of the wall influence the result in a decisive manner, from which follows that in practice a calibrating curve, which is valid only within narrow limits must be made for every measuring task. Certain simplifications and standardization of the nozzle shape (FIG. 3) have brought about some improvement and made possible a better reproducibility of the measuring results. However the correlation between the flow velocity and the pressure difference as measured remains complicated even for a standardized tube.

It has now been found, that some surprising results, which cannot be deduced from any literature known to date, can be achieved if the venturi tube of traditional shape is replaced by a simple double cone, whose angles at the entrance and exit sides satisfy the condition:

$$F = (1 + \sin \theta_1)^2 \cdot \sin^2 \theta_2 < 0.11$$

where $\theta_1$ represents the aperture angle of the entrance cone
$\theta_2$ represents the aperture angle of the exit cone.

Figure 4:
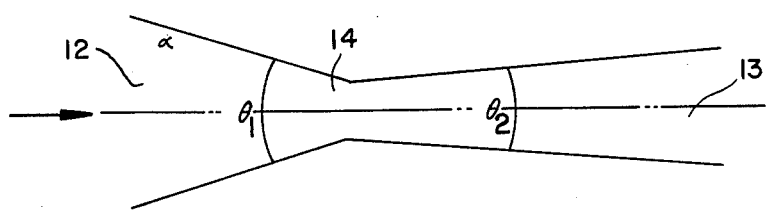

Such a double cone as is shown in FIG. 4, e.g. in a symmetrical form, i.e. with equal aperture angles of both of the opposed hollow cone trunks, not only makes possible an easier representation and calculation of the hydrodynamical situation and, within a wide range, a better conformity of measured and calculated data; very surprisingly there has also been found a higher efficiency. That is, with a given flow speed of the fluid medium, a higher pressure difference has been found between the entrance cross-section and the narrowest part of the double cone. This efficiency, which not only depends from the aperture angle of the two cone trunks, but in a certain degree from the length of the entrance and exit cones as well, can be evaulated from the numerical value of the function F. The more this value lies below the limit of 0.11, as given above, the higher is the efficiency of the double cone. Referring to the FIG. 4, in which the double cone according to the invention is represented, values of the function F are shown for some selected configurations:

TABLE 1

$F = (1 + \sin^2\theta) \cdot \sin^2\theta_2$
"efficiency factor" of the double cone for different aperture angles of the entrance and exit cones.

| entrance cone angle° | exit cone angle° | | | | |
|---|---|---|---|---|---|
| | 1 | 3 | 6 | 10 | 15 |
| 1 | 0.0003 | 0.0028 | 0.0113 | 0.0312 | 0.0693 |
| 3 | 0.0003 | 0.0030 | 0.0121 | 0.0334 | 0.0742 |
| 6 | 0.0004 | 0.0033 | 0.0133 | 0.0368 | 0.0817 |
| 10 | 0.0004 | 0.0038 | 0.0151 | 0.0415 | 0.0923 |
| 15 | 0.0005 | 0.0043 | 0.0173 | 0.0478 | 0.1061 |
| 20 | 0.0005 | 0.0049 | 0.0197 | 0.0543 | 0.1206 |
| 30 | 0.0007 | 0.00672 | 0.0246 | 0.0678 | 0.1507 |

From table 1 it can be seen that the value of the function F is much more dependent on the dimensions of the exit angle than on that of the entrance angle. As long as the exit angle is small enough good results can be obtained even with relatively wide entrance angles. On the other side a symmetrical double cone, i.e. with equal aperture angles and lengths on the entrance and exit sides, can be used with good effect, as long as the aperture angle does not exceed 10°. For the classification of the efficiency of a double cone, the following values may serve as a guide:

| Function F | | |
|---|---|---|
| | <0.0035 | excellent |
| | 0.0035–0.0155 | very good |
| | 0.0155–0.0250 | good |
| | 0.0250–0.0500 | fair |
| | 0.0500–0.1100 | just sufficient |
| | >0.1100 | not sufficient |

An interesting property of the double cone according to the present invention is the dependence of its efficiency on the pressure prevailing in the system. Under identical geometric conditions and at an identical liquid flow rate, the pressure difference between the entrance cross section and the lateral socket at the point of the narrowest cross section is higher, the higher the total pressure prevailing in the system. The flow resistance along the double cone varies in the same sense, becoming continually lower when the pressure rises. This behaviour is totally surprising and cannot be expected—for incompressible liquids at least—from the known hydrodynamic theory.

EXAMPLE

Symmetrical double cone, total length 140 mm aperture angle of entrance and exit cones: 6° diameter at narrowest point: 1.94mm medium: water at 20° C.
Flow rate with constant pressure difference of 0.600 bar:

| system pressure at entrance | flow rate 1 tr/min |
|---|---|
| 1 bar | 185 |
| 2 bar | 225 |
| 3 bar | 255 |

As a further surprising effect of the double cone according to this invention it was found that—at equal flow rates—the resulting pressure difference between the entrance and the narrowest point is higher in an open system than in a closed system with forced circulation. That means, that a double cone, immersed into flowing water will produce a higher pressure difference than the same double cone, in which a flow of the same velocity is produced by a pump.

In its simplest form (FIG. (4) the double cone consists of two hollow cone trunks which are axially connected by their smaller bases. To produce a good efficiency, both aperture angles are chosen in such a way, that the function F of table 1 takes on a good value. Apropriate aperture angles are between 1 and 15 degrees; the proportion between the diameters at the entrance and exit respectively and the diameter at the narrowest point of the double cone, which is a function of the length and the aperture angle of each cone trunk, lies within the limits of 1:1 to 1:200.

In order to make use of the pressure difference produced by the flow through the double cone, an outlet is needed at its narrowest point, through which the negative pressure existing at this place can be made operative externally. A round openign connected to a radial socket may be suitable as such. However this disposition suffers from a certain asymmetry, which may be of disadvantage, if a flow of a certain importance gets admitted through the lateral opening into the axial main stream.

For practical purposes a special design was therefore developed, which proved to be advantageous for technical uses. In particular it renders possible a lateral flow entering at this place symmetrically around the whole cross-section of the flow. In this design (FIG. 5) there is a gap at the point of narrowest diameter, which separates the two hollow cone trunks whose smaller faces are now opposed to one another at the distance h. At the same time the two cone trunks are coaxially linked by a length of cylindrical tube which surrounds the gap and holds the two cone trunks together. This cylindrical connecting tube is carrying, at its mantle, one or more openings with radial sockets. If d represents the smallest diameter of the two hollow cone trunks, the best values for the other dimensions in the region of the double cone orifice may be as follows:

distance between the two cone base : h=0.001 ... 20 d
inner diameter of hollow cylinder : T=1 ... 100 d
inner diameter of radial socket : S=0.001 ... 10 d It can furthermore be shown that the efficiency of the double cone can be further improved by a special design as shown in FIG. 5a. In this design the double cone is divided asymmetrically, producing the distance h unilaterally, by cutting the end of the exit cone alone. Relating to the symmetry plane of the connecting hollow cylinder, the smaller base of the entry cone is shifted by the distance h/2 in a counter-current direction. The smallest diameter $d_1$ of the entrance cone is kept unchanged, whereas the corresponding diameter of the exit cone is increased by an amount $$h \cdot \frac{(D_2 - d)}{(L_2 + h)}$$

whereby $D_2$ refers to the greatest diameter and $L_2$ the length of the exit cone.

The nature of the invention and its possible technical applications are illustrated by the FIGS. 1 to 18, though they do not represent an exhaustive list FIG. 1: The conventional form of the venturi tube in a longitudinal section. The liquid medium flows through the entrance cone (1) via the the narrowest point (3) to the exit cone (2). The lowest pressure is observed at the restriction (3).

Figure 2:
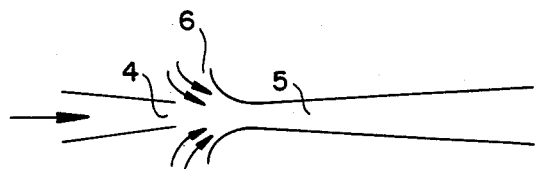

FIG. 2: The conventional form of the water jet pump as an application of the venturi tube. Water flows through the nozzle (4) towards the venturi tube (5). Air or some other fluid medium is sucked in by the reduced pressure at point (6)

Figure 3:
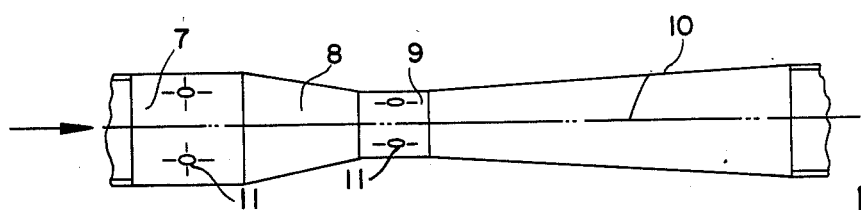

FIG. 3: Standardized form of the venturi tube according to norm sheet ISO 15 (1983). The medium is flowing from the cylindrical entrance tube (7) to the entrance cone (8), whose cone angle is about 21°. The cylindrical nozzle piece (9), whose length equals its diameter, as well as the entrance tube (7) are provided with lateral openings (11). The flowing medium is led away by the conical exit5 bue (10), whose aperture angle lies between 7.5° and 15°.

FIG. 4: The double cone according to the present invention in its simplest basic form with the entrance cone (12) and the exit cone (13). The lowest pressure prevails at the restriction (14).

Figure 5:
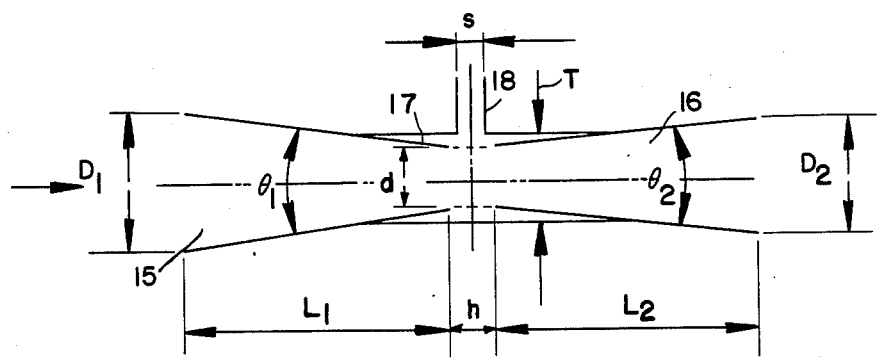
Figure 5A:
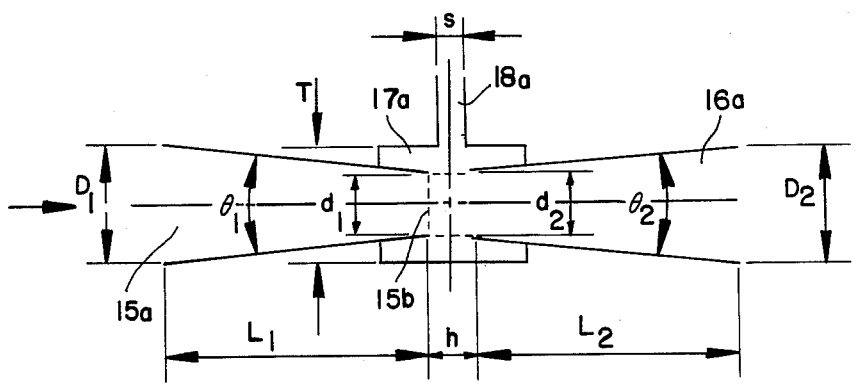

FIG. 5: A realization of the double cone according to an apparatus in a longitudinal section. The entrance cone (15) has the length $L_1$, the greatest diameter $D_1$ and the aperture angle; the exit cone (16) has the length $L_2$, the greatest diameter $D_2$ and the aperture angle; the smaller bases of the two cone trunks, both with the same diameter d, are disposed inside the cylindrical connecting tube (17). This tube (17) with the internal diameter T is provided with a lateral socket (18) with the internal diameter S.

FIG. 5a: An improved version of the double cone, according to an appratus: The arrangement of the two hollow cone trunks is similar to that of FIG. 5 but the original intersection circle (15b) of the two cones is shifted upstream by the distance h/2, and the exit cone trunk (16a) is curtailed by the length h. By that the entrance cone trunk (15a) keeps its former smallest diameter $d_1=d$; the corresponding diameter of the exit cone (16a) is somewhat wider, $$d_2 = d + h \cdot \frac{(D_2 - d)}{(L_2 + h)}$$

FIGS. 6 to 18 illustrate a number of technical applications of the double cone according to the present invention. If not remarked otherwise, the applications as shown are based on one of the forms of FIGS. 5 and 5a. In many cases, because of the simplicity of its design, the symmetrical form is used, i.e. a double cone, whose entrance and exit cones are of the same length and have the same aperture angle. The choice of application shown is not exhaustive at all; other possibilities can readily be derived from the examples.

Figure 6:
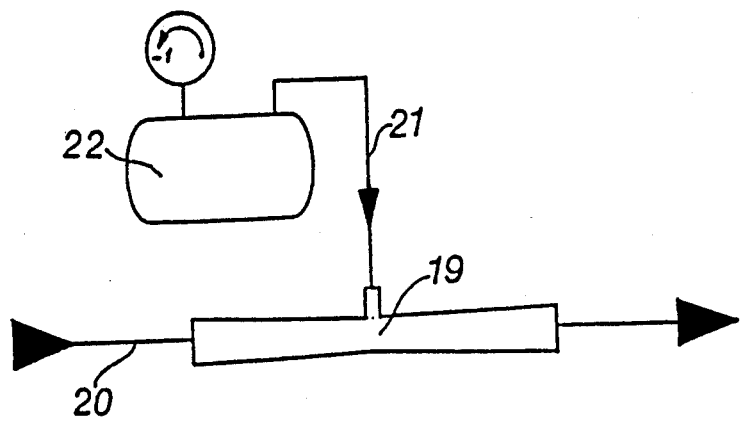

FIG. 6: The use of the double cone according to this invention as a water jet pump. The application corresponds to that of the conventional water jet pump, but is has the advantages of the invention mentioned before. The double cone is perfused by a water jet (20) in the direction of the arrow. By the depression produced, the closed vessel (22) is evacuated via the conduit (21). The exhausted air escapes together with the water at the exit of the double cone.

The following table 2 illustrates the performance of the double cone according to the invention, compared with a conventional water jet pump.

TABLE 2

Comparison of performance between double cone according to the invention and conventional water jet pump.

| water pressure at entrance mb | double cone | | | conv. water jet pump | | |
|---|---|---|---|---|---|---|
| | vacuum mb after 10 min | water l tr/hr a* | b* | vacuum mb after 10 min | water l tr/hr a* | b* |
| 300 | −225 | 78 | 115 | −105 | 125 | 140 |
| 400 | −310 | 91 | 123 | −140 | 143 | 163 |
| 500 | −385 | 104 | 139 | −185 | 160 | 183 |
| 600 | −450 | 112 | 151 | −215 | 176 | 200 |
| 700 | −500 | 123 | 160 | −250 | 190 | 218 |

*water consumption:
a at beginning,
b at end of evacuation
dimensions of double cone: symmetrical, aperture angle 6°
length: twice 70 mm
nozzle width: 2 mm
Water jet pump:
nozzle width: 2 mm With comparable dimensions of both devices, a much better vacuum is attained with the double cone, with 25 to 35% less water consumption. Besides, only the vacuum attained after 10 minutes is noted in the table. In fact, after sufficient time, a vacuum of −720 mb is attained with the double cone with a water pressure of only 200 mb, whereas, with the conventional water jet pump, with the same water pressure a final vacuum of only −60 mb can be attained.

Figure 7:
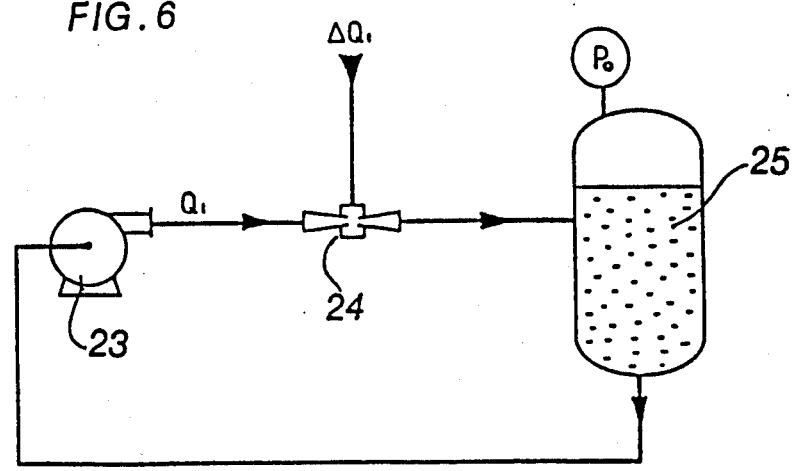

FIG. 7: Use of the double cone according to the invention as a pressure pump. Water is pumped in a circuit by the turbine (23) through the double cone (24) and the closed pressure is sucked in and collected in the upper part of the pressure vessel.

A comparison with the conventional water jet pump shows again the superiority of the device of this invention. With dimensions comparable to those of example 6 and with a water pressure of 1000 mb at the inlet of the pumping device, in the pressure vessel a final pressure of 1000 mb can be reached with the conventional jet pump, whereas with the device of this invention a final pressure of 5000 mb was attained, i.e. a multiple of the pressure used at the pump inlet.

Figure 8:
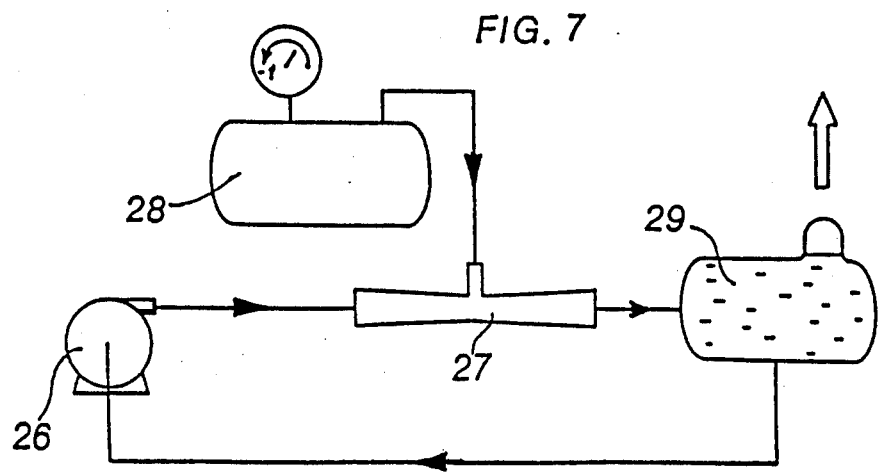

FIG. 8: The simultaneous use of a double cone as a vacuum and pressure pump in a single circuit. By means of the turbine (26) water is pumped in a circuit through the double cone (27) and the pressure vessel (29). The vessel (28) to be evacuated is connected to the lateral socket of the double cone.

As in the two foregoing examples 6 and 7 an increased pumping efficiency—as compared with a conventional water jet pump—is attained in both the vacuum and the pressure vessel.

Figure 9:
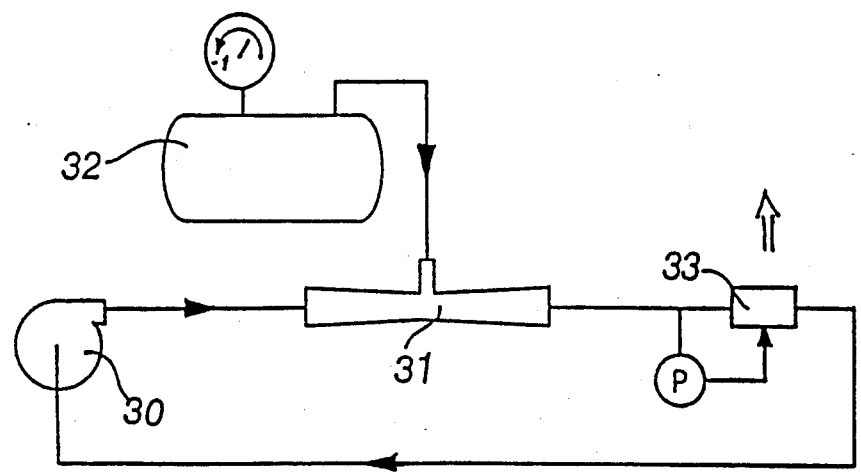

FIG. 9: Transfer of a gas from a vessel with low pressure to a second vessel with increased constant pressure by means of a circulating pump of relatively low performance. By means of the circulation pump (30) the gas is pumped, in a closed circuit, through the double cone (31) and the pressure vessel (33) back to the pump (30). From the vessel (32), which is under low pressure, gas is sucked into the circuit until the pressure balance is attained. From the vessel (33), which is equipped with a pressostat (P) gas can be withdrawn as required and led, at the higher pressure of vessel (33), to any use. The quantity of gas withdrawn is replaced automatically out of the low pressure vessel into the circuit.

The device lends itself for the drawing off into storage vessels e.g. of noble gases or other gaseous media, using a circulating pump of but low performance.

Figure 10:
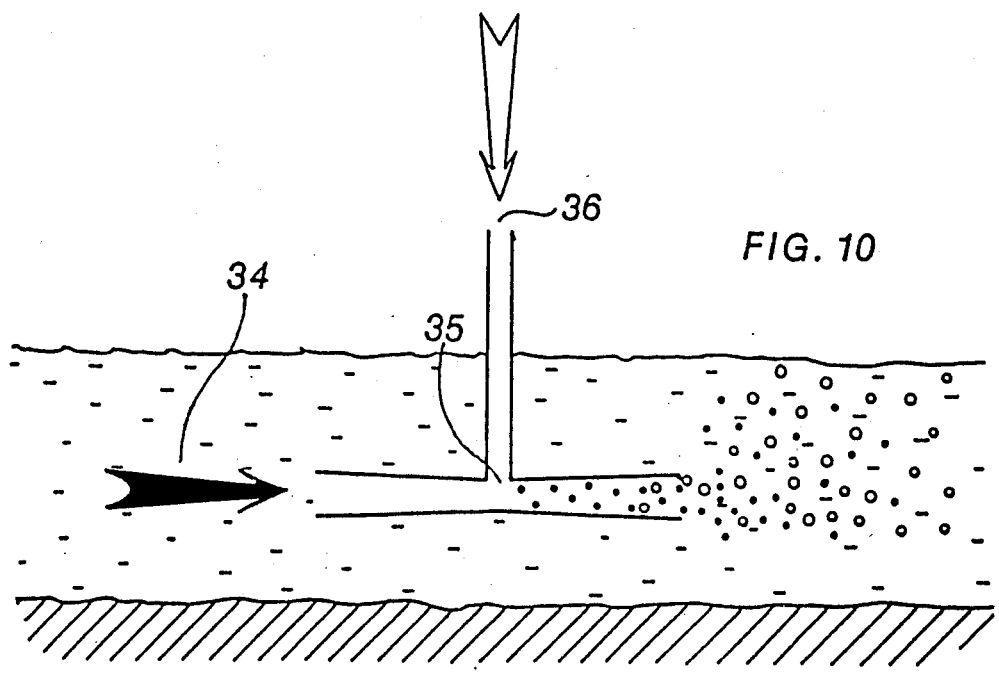

FIG. 10: Aeration of a flowing water course by means of the double cone of the present invention. A double cone (35) is immersed to a given depth into the water course (34). The stream of water flowing through the double cone produces, at its narrowest point, a negative pressure, by which air (36) is sucked in from the surface and distributed in the water stream in the form of fine bubbles.

The device shown is especially suited for the aeration of water courses because with the double cone a relatively high pressure difference is produced even at modest flow speed of the water. The special properties of the double cone produce a lower flow resistance and higher sucking effect if the cone is immersed into greater depth. Therefore the device is especially suited for the aeration of the deeper zones of the water course.

Figure 11:
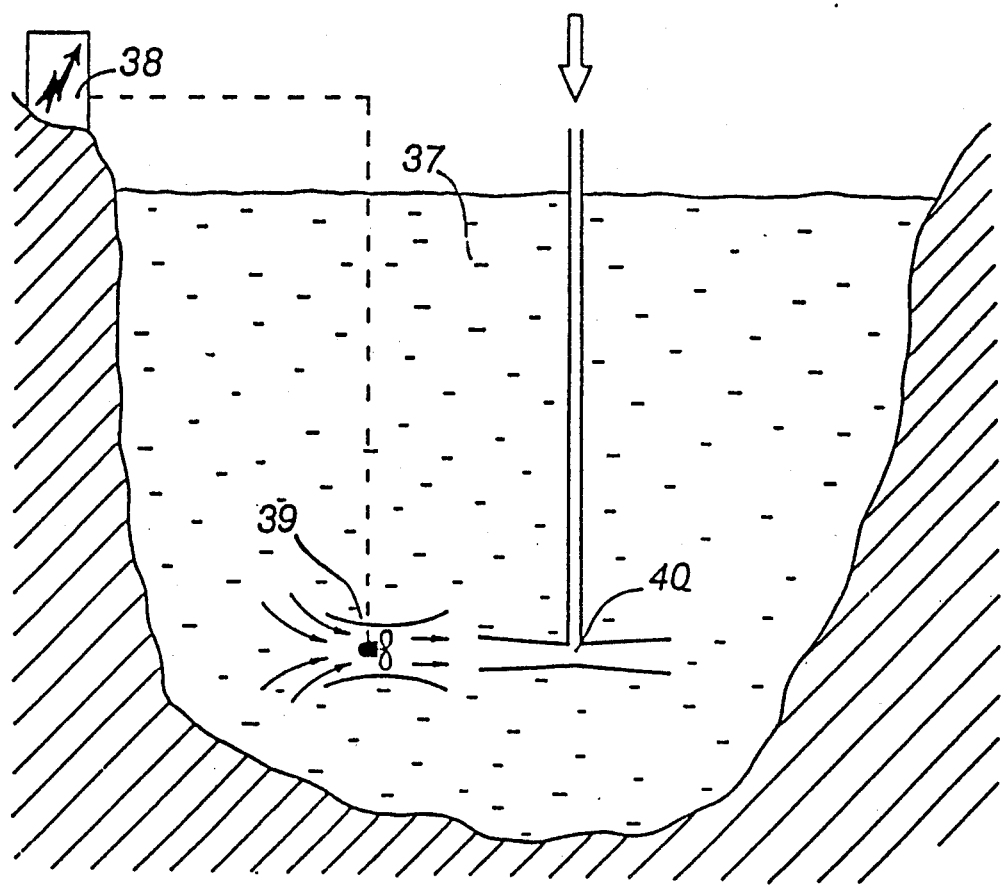

FIG. 11: Use of the double cone for the aeration of a stagnant water body. At a certain depth of the stagnant water body (37) the turbine (39), fed by the source (38) of current, is producing a flow of water towards the double cone (40) mounted at the same depth as the turbine. By the negative pressure produced in the double cone air, is sucked in from the surface and finely distributed in the surrounding water.

Figure 12:
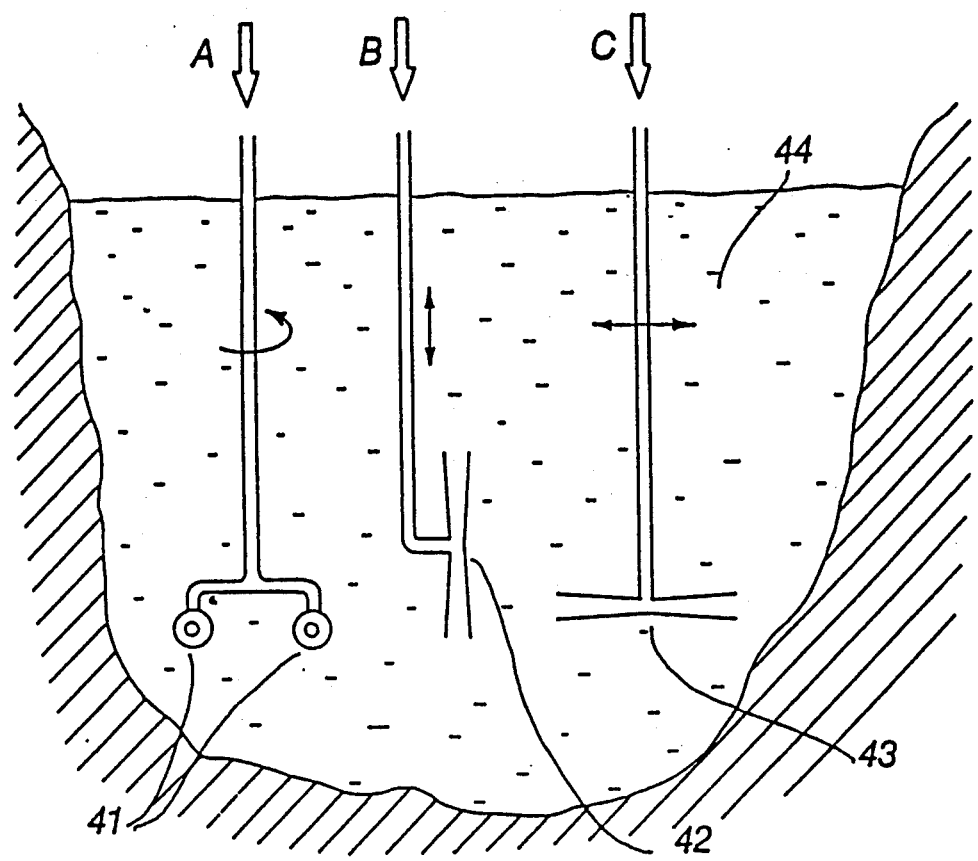

FIG. 12: Three other methods for the aeration of a stagnant water body by means of the double cone.

Part A shows two double cones (41) displayed in cross section, fixed to a rotating hollow shaft. The flow in the longitudinal axis of the double cones, produced by the rotation is used to suck in air through the hollow shaft and to distribute it in the surrounding water.

Part B shows a double cone (42) which is moved up and down vertically by means of the hollow shaft. Inside the double cone a vertical flow is produced, which is used to suck in air through the hollow shaft and to distribute it in the surrounding water.

Part C finally shows a double cone (43) mounted on a hollow shaft which is moved horizontally forwards and backwards. A lengthwise flow results in the double cone which is used to suck in air and to distribute it in the surrounding water (44).

Figure 13:
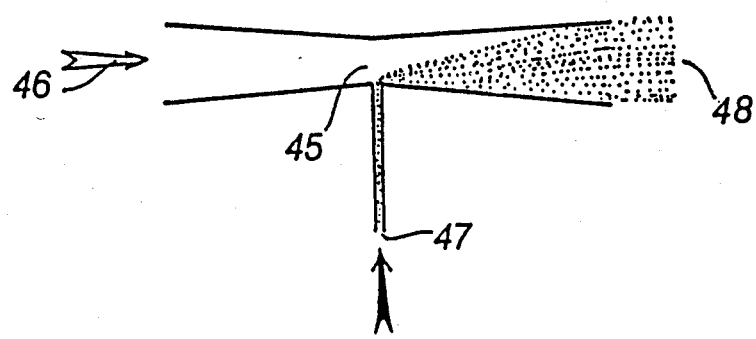

FIG. 13: The use of a double cone as a device for the production of an aerosol by atomizing a liquid in a gas stream. In the double cone (45) a negative pressure is produced by a stream of air (46), by which a liquid (47) is sucked in through the lateral socket then finely dispersed in the exit cone and finally escaping out of the double cone as an aerosol (48).

Figure 14:
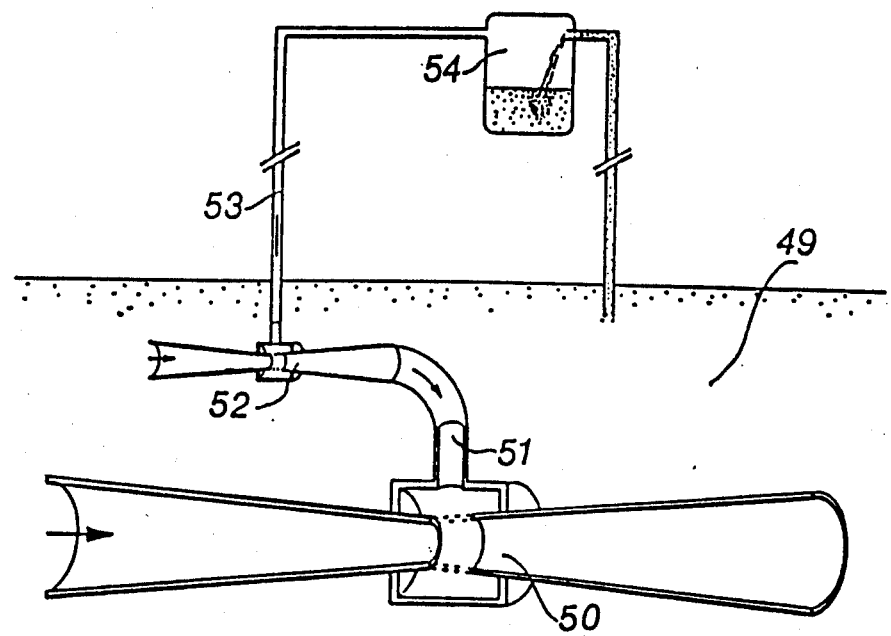

FIG. 14: Amplification of the pressure difference produced in a double cone by a further stage with a second double cone. In a flowing water course (49) a first double cone (50) is mounted with its longitudinal axis parallel to the direction of flow. The lateral socket (51) is connected to the exit cone of a second double cone (52) of smaller dimensions. By this arrangement the depression produced in the socket (51) is amplified once again. The amplified pressure difference is used to pump water by the conduit (53) into the vessel (54).

In a practical experiment a first double cone with a length of 3 meters and a diameter of 90 mm at its narrowest point was mounted below the surface of a river, whose flow speed was measured to be 2 meters per second. Its lateral socket was connected to a second double cone (52) whose length was 170 mm and whose smallest internal diameter was 5 mm. The aperture angle was 6° on both sides of the two double cones. At the first lateral socket (51) a depression of —140 cm water gauge, and at the second lateral socket a depression of —600 cm water gauge were measured, by which 25 liters of water per hour could be pumped up into the vessel (54). Compared with the depression of —600 cm water gauge produced by the device, the dynamical flow pressure of the running water at its speed of 2 m/sec was only 20 cm water gauge.

Figure 15:
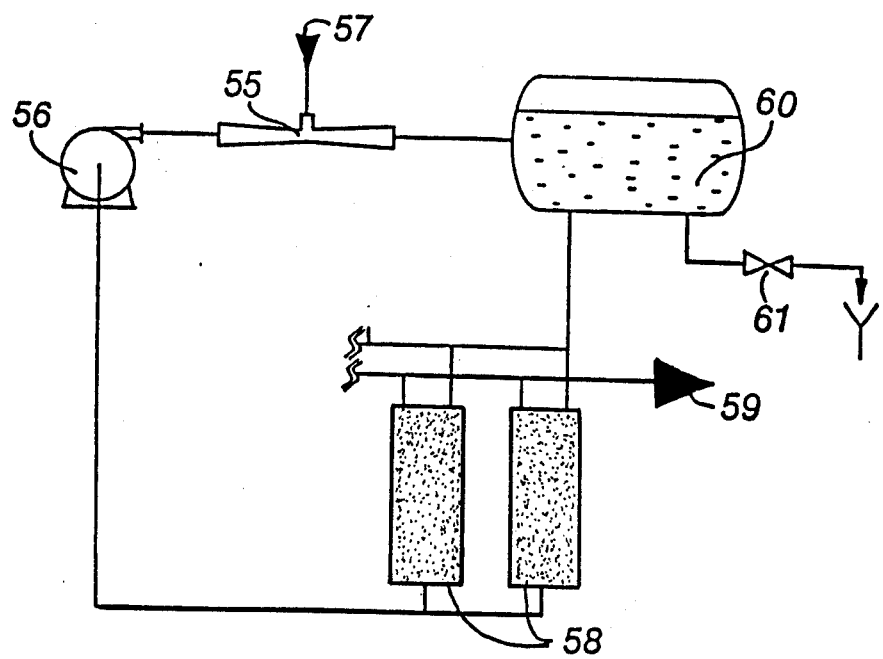

FIG. 15: Application of the double cone according to the present invention for the desalination of sea water by reverse osmosis.

By means of the turbine (56) sea water is pumped in a circuit through the double cone (55), the pressure vessel (60) and the two molecular filters (58). The power of the turbine is regulated in such a way that the pressure in the vessel (60) is at least 55 bar. By this pressure part of the sea water will be forced through the molecular filter whereby most of the salt is retained and will concentrate in the circuit. The desalinated water can be withdrawn at the outlet (59); liquid lost in the circuit will be replaced automatically by fresh sea water through the inlet (57). The enriched brine can be withdrawn continuously or as occasion demands, by the valve (61), whereby fresh sea water enters the circuit by the inlet (57) until the pressure balance is restored.

As molecular filters PERMASEP ® of DuPont de Nemours, Wilmington U.S.A. may be used, which are permeators with Aramide hollow fibers, allowing, at the pressure indicated, to desalinate to 98.5% sea water with a salt content of 42'000 ppm.

Figure 16:
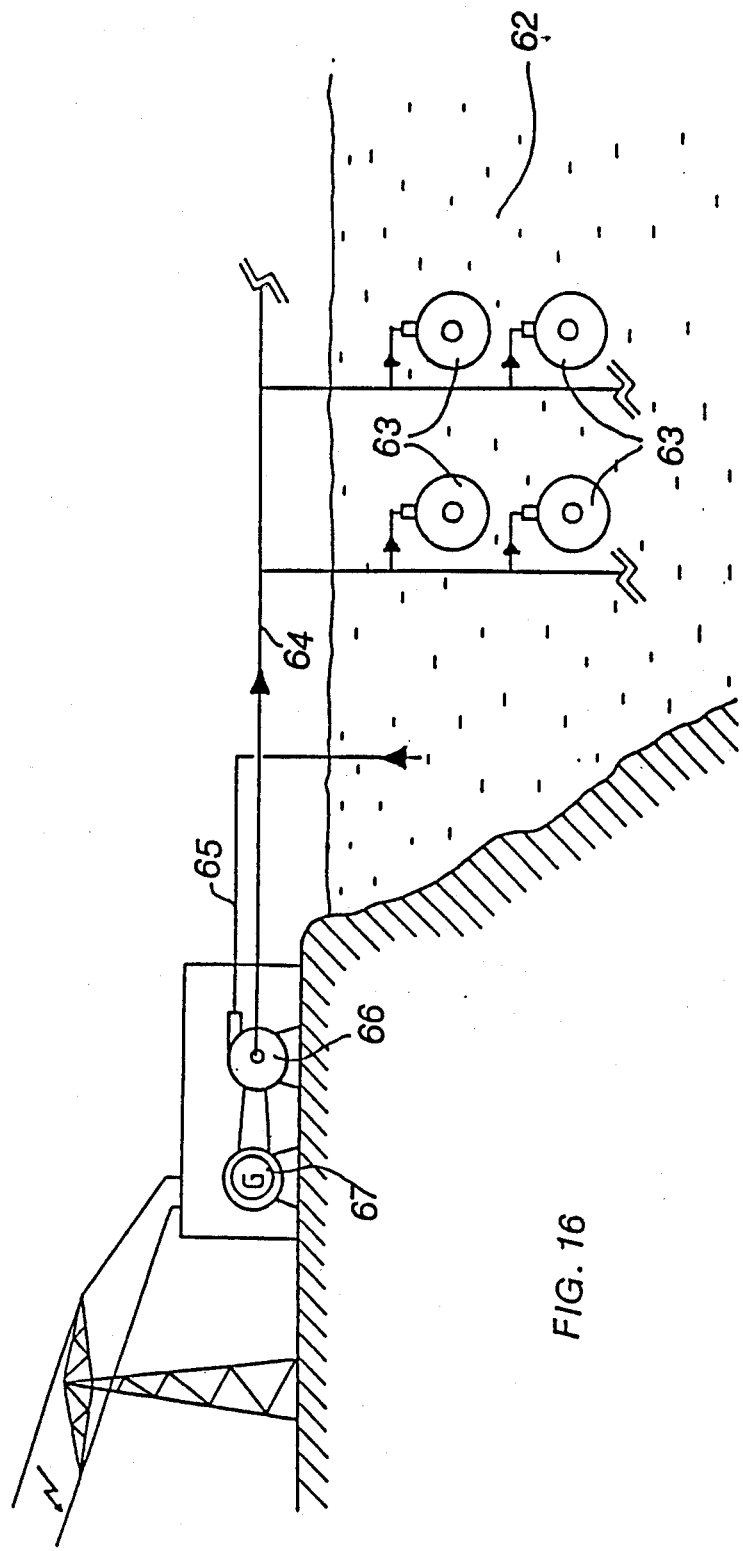

FIG. 16: The schematic layout of a plant for extracting energy out of a flowing water course. In the water course (62) a number of double cones (63) according to the present invention of which 4 are shown in the figure, are mounted with their longitudinal axis parallel to the direction of flow. The lateral socket of each double cone is connected to the conduit (64). Water is withdrawn from the river by the conduit (65) and led, through the turbine (66), to the suction conduit (64) and from there again via the battery of double cones back to the river The turbine (66) is driven by the circulation of water; its energy is used to drive the generator (67) and finally withdrawn by the electric cable as indicated in the figure.

In this example the double cone according to the invention serves for transforming the energy of a slow-flowing water course into a form which is technically utilizable. Under normal circumstances this can only be realized by a big techincal investment, e.g. the construction of a dam. Apart from the high costs the alteration of the landscape inherent to such a project is usually undesirable. As shown in the examples 6,7,8 and 14 the double cone enables the modest dynamic pressure of a slow flowing water course to be raised to a substantial degree. As a result a turbine of conventional construction may be exploited with normal energy yield. It could be shown by experiments that in a river with a flow speed of only 2 m/sec an energy yield of 57% can already be obtained with a small double cone with a nozzle diameter of 9 cm and an aperture angle of 6° on both sides. With double cones of greater sizes still better yeilds can be expected. The expenditure for the construction of a plant as shown in FIG. 16 is very low when compared with the construction of a dam. The double cone is especially suited for exploiting a fraction whatever small of the total enery available of a river. With growing energy demand it will be possible to extend the plant at any time by adding further unities.

Figure 17:
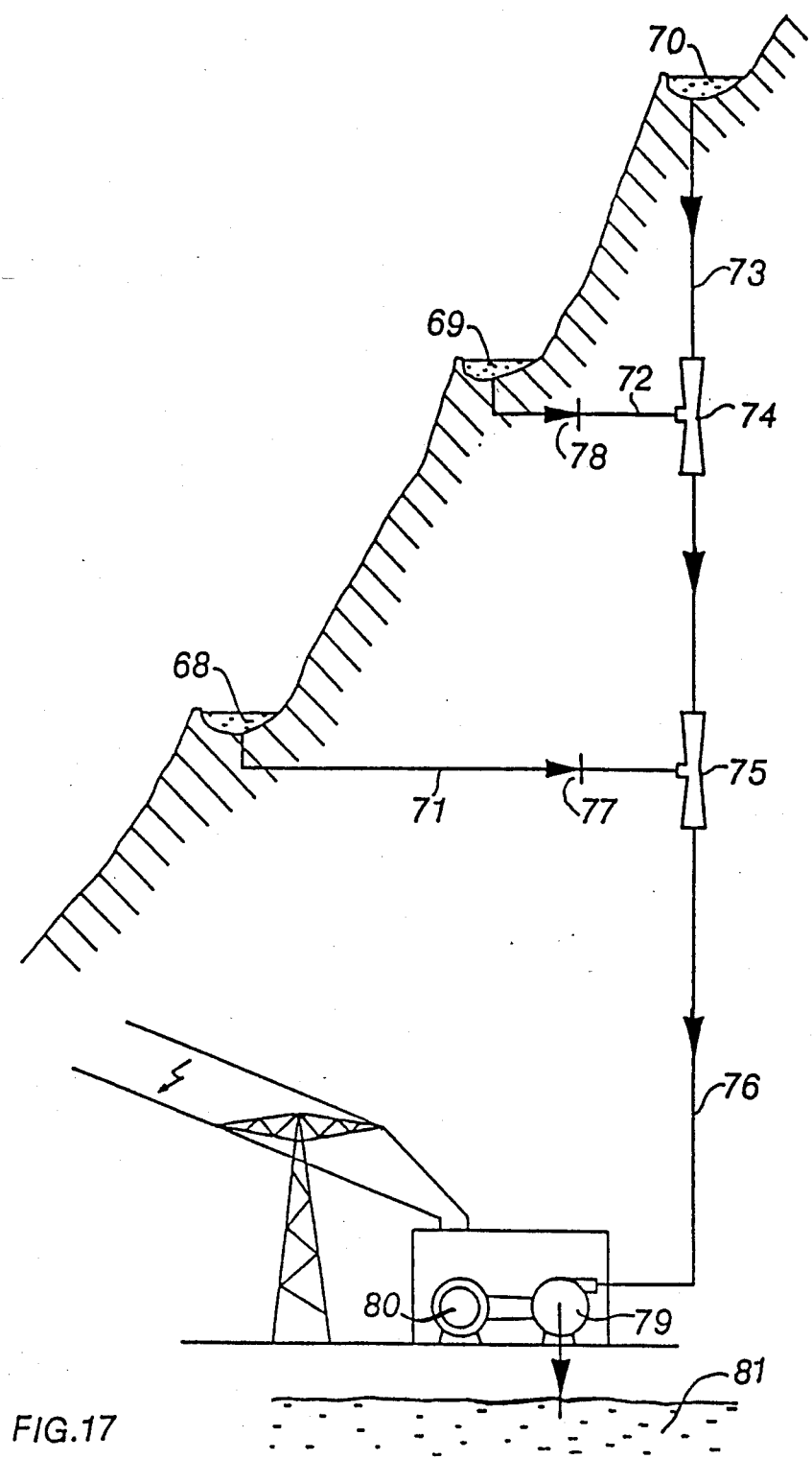

FIG. 17: Use of the double cone according to the invention as a device for the automatic control of a plant in which a turbine is fed by several reservoirs on different levels.

The three reservoirs (68), (69) and (70), each situated on a different level, are connected to the main feed line of the turbine (79) by the three conduits (71), (72) and (73). The double cones (74) and (75) serve to control the outflow of the three reservoirs: The conduit 973) from the highest reservoir (70) discharges into the longitudinal axis of the double cone (74), the outlet of the next highest reservoir (69) into the lateral inlet of the same double cone. One further double cone (75) is disposed at the inlet (71) from reservoir (68). The control effect of the two double cones depends on the fact, that the water flow along the longitudinal axis in the first instance exerts a suction effect to the lateral inlet, by which the pressure difference caused by the difference of level is compensated. Water from the system under lower pressure can thus flow into the main feed line. On the other side the axial flow in the double cones is kept back by the lateral inflow of water. The consequence of this is an automatic adjustment to a certain proportion of flow in the two conduits (72) and (73) at the double cone (74) and, in the same manner, in the two conduits connected to double cone (75).

(80) illustrates the generator driven by the turbine (79); (81) is the reservoir which collects the water leaving the turbine after having delivered its energy. In order to prevent any flow of water from the reservoirs (70) and (69) into reservoir (68) when the turbine is stopped, the two non-return valves (77) and (78) are disposed in the conduits (71) and (72).

Figure 18:
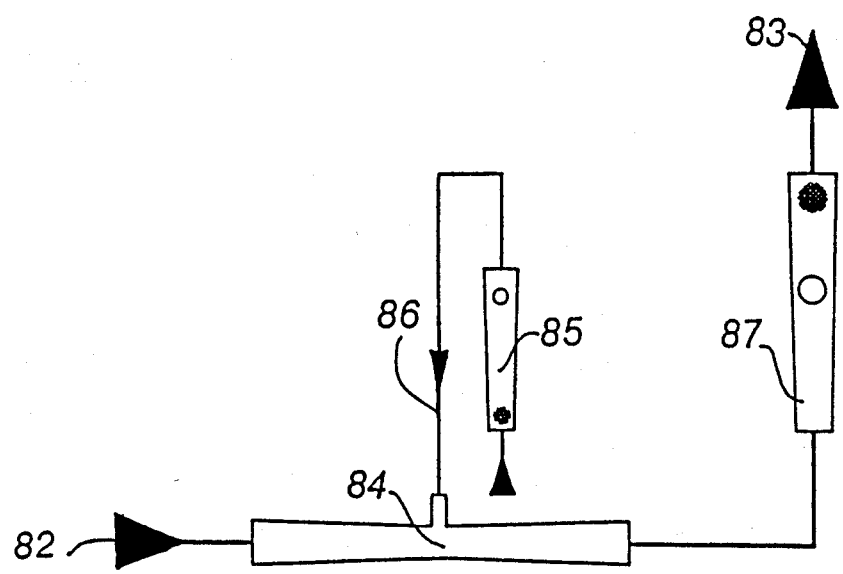

FIG. 18: The possibility to use the double cone as a control instrument already realized in the foregoing example 17 may again be illustrated in a different way: A stream of liquid (82) is flowing in the longitudinal axis of the double cone (84) in the direction of the outlet (83). A lateral flow (86) of the same liquid which is regulated by a valve not shown in the figure can be let in to the middle socket. Thanks to the special hydrodynamic properites of the double cone, already a modest lateral inflow will cause an amplified control in the opposite sense of the main axial flow. In FIG. 18 the two devices (85) and (87) are flow meters; by their distinct size the difference of flow size in the axial and lateral streams is intimated. The example may readily be applied to the control of a gas stream.

We claim:

1. Apparatus for extracting energy from a flowing fluid consisting of a split double cone perfused in an axial direction by a fluid medium, characterized in that the double cone is composed of two hollow cone trunks arranged axially with their smaller faces opposed to one another and having diameters $d_1$ and $d_2$ at a distance h and surrounded at the region of their smallest diameter by a coaxial cylindric tube with a connecting socket at its mantle surface at which a reduced pressure is produced wherein the aperture angles of the cones are between 1 and 10 degrees and fulfill the condition $$F = (1 + \sin \theta_1)^2 \cdot \sin^2 \theta_2 < 0.02$$

$\theta_1$ representing the aperture angle of the entrance cone and $\theta_2$ representing the aperture of the exit cone wherein the proportion of the smallest diameter $d_1$ to the widest diameter $d_2$ of the cones is between 1:1.5 and 1:200, and where $d_1$ represents the smallest diameter of the entrance cone, the two cone trunks are split at a line downstream from the virtual section circle of the two cones by the distance $h/2$, the smaller end of the exit cone being cut by the length h, so that the free distance between the two cones is h, the smallest diameter of the exit cone truck is $$d_2 = d_1 + h \cdot \frac{(D_2 - d_1)}{(L_2 + h)},$$

where $D_2$ represents the greatest diameter and $L_2$ the length of the exit cone trunk and where h is between 0.001 and 20 $d_1$.

2. Apparatus according to claim 1, wherein the fluid medium is moved axially through the split double cone by an external pump.

3. Apparatus according to claim 1, surrounded on all sides by a fluid medium, through which said apparatus is moved axially in a direction of its longitudinal axis.

4. Apparatus according to claim 1, surrounded on all sides by a fluid medium, and being moved on a circular path through this medium, its axis remaining in a tangential direction, whereby the fluid medium is driven axially through it by this movement.

5. Apparatus according to claim 1, disposed fixedly in a flowing liquid medium in such a manner that its longitudinal axis is directed substantially parallel to the direction of flow, whereby it is perfused by the medium and surrounded by it on all sides.

* * * * *

UNITED STATES PATENT AND TRADEMARK OFFICE
CERTIFICATE OF CORRECTION

PATENT NO. : 4,792,284

DATED : December 20, 1988

INVENTOR(S) : Paul W. Straub et al

It is certified that error appears in the above-identified patent and that said Letters Patent is hereby corrected as shown below:

Cover Sheet, Column 2, line 15, "Bank" should read --Band--
Cover Sheet, Column 2, lines 15 & 16, "Duseldork" should read --Duseldorf--
Cover Sheet, Column 2, line 16, "Regelbars" should read --Regelbare--
Cover Sheet, Column 2, line 19, "Bank" should read --Band--
Column 1, line 7, "certan" should read --certain--
Column 1, line 56, "0.11" should read --0.02--
Column 2, line 8, "0.11" should read --0.02--
Column 2, line 15, "$(1 + \sin^2\theta)$" should read --$(1 - \sin\theta_1)$--
Column 3, line 32, "openign" should read --opening--
Column 4, line 26, "exit5 bue" should read --exit tube--
Column 4, line 36, "angle ;" should read --angle $\theta_1$--
Column 4, line 37, "angle ;" should read --angle $\theta_2$--
Column 4, line 44, "appratus" should read --apparatus--
Column 5, line 41, "pressure is" should read --pressure vessel (25). At the lateral socket of the double cone air is--
Column 5, line 45, "WIth" should read --with--
Column 6, line 26, "deepter" should read --deeper--
Column 7, line 59, "techincal" should read --technical--
Column 8, line 4, "yeilds" should read --yields--
Column 8, line 19, "973)" should read --(73)--

UNITED STATES PATENT AND TRADEMARK OFFICE
CERTIFICATE OF CORRECTION

PATENT NO. : 4,792,284

DATED : December 20, 1988

INVENTOR(S) : Paul W. Straub et al.

It is certified that error appears in the above-identified patent and that said Letters Patent is hereby corrected as shown below:

Column 8, line 52, "properites" should read -- properties --.

Signed and Sealed this

Twelfth Day of September, 1989

*Attest:*

DONALD J. QUIGG

*Attesting Officer*  *Commissioner of Patents and Trademarks*